(12) United States Patent
Hatem

(10) Patent No.: US 11,017,075 B1
(45) Date of Patent: May 25, 2021

(54) DETECTING DIGITAL CONTENT PERFORMING BROWSER FINGERPRINTING USING WEBRTC

(71) Applicant: Amazon Technologies, Inc., Seattle, WA (US)

(72) Inventor: Onur Volkan Hatem, Edinburgh (GB)

(73) Assignee: Amazon Technologies, Inc., Seattle, WA (US)

(*) Notice: Subject to any disclaimer, the term of this patent is extended or adjusted under 35 U.S.C. 154(b) by 231 days.

(21) Appl. No.: 16/206,906

(22) Filed: Nov. 30, 2018

(51) Int. Cl.
*G06F 21/53* (2013.01)
*G06F 9/455* (2018.01)

(52) U.S. Cl.
CPC .......... *G06F 21/53* (2013.01); *G06F 9/45558* (2013.01)

(58) Field of Classification Search
CPC ...... G06F 21/53; G06F 9/45558; G06F 21/56; G06F 21/566; G06F 21/50; H04L 63/16; H04L 63/14; H04L 63/102; H04L 41/0681; H04L 67/303; H04L 63/10
See application file for complete search history.

(56) References Cited

U.S. PATENT DOCUMENTS

| | | | | |
|---|---|---|---|---|
| 9,032,066 B1 * | 5/2015 | Erdmann | ................ | G06F 21/53 709/224 |
| 2014/0095724 A1 * | 4/2014 | Yoakum | ............ | H04L 29/08054 709/228 |
| 2018/0025157 A1 * | 1/2018 | Titonis | .............. | H04W 12/1208 726/24 |
| 2018/0205720 A1 * | 7/2018 | Westerlund | ........... | H04L 67/104 |
| 2019/0116154 A1 * | 4/2019 | Auge Pujadas | ......... | H04L 67/14 |
| 2019/0213325 A1 * | 7/2019 | McKerchar | ............ | G06F 21/51 |

* cited by examiner

*Primary Examiner* — Harunur Rashid
(74) *Attorney, Agent, or Firm* — Eversheds Sutherland (US) LLP

(57) ABSTRACT

Systems, methods, and computer-readable media are disclosed for detecting digital content performing browser fingerprinting using web real-time communication (WebRTC). In one embodiment, an example method may include receiving digital content from a content server, rendering the digital content at a browser, determining application programming interface (API) call activity on the browser, the API call activity being caused by the digital content, determining that the API call activity comprises WebRTC API call activity, and determining, based at least in part on the WebRTC API call activity, that the digital content violates a policy for serving digital content at user devices.

17 Claims, 5 Drawing Sheets

DETECTING DIGITAL CONTENT PERFORMING BROWSER FINGERPRINTING USING WEBRTC

BACKGROUND

Digital content may be presented at electronic user devices such that users can consume or interact with the content. In many instances, multiple pieces of digital content may be presented at respective content delivery slots of a webpage. For example, a user may access a webpage by executing a web browser on a user device, and a variety of digital content may be delivered to the web browser for presentation at different delivery slots of the webpage. In certain instances, some of the digital content may be controlled and hosted by a content publisher for the webpage, while other digital content may be controlled and hosted by a third party. In such instances, before serving the third-party digital content, the content publisher may scan such content to determine compliance or noncompliance with certain policies for serving digital content at user devices. For example, the third-party digital content may be scanned to identify an intent to collect personally identifiable information associated with users to which the digital content is presented. However, existing scanning techniques may not be able to detect certain privacy or security risks, such as digital content implementing code to perform browser fingerprinting.

Figure 1:
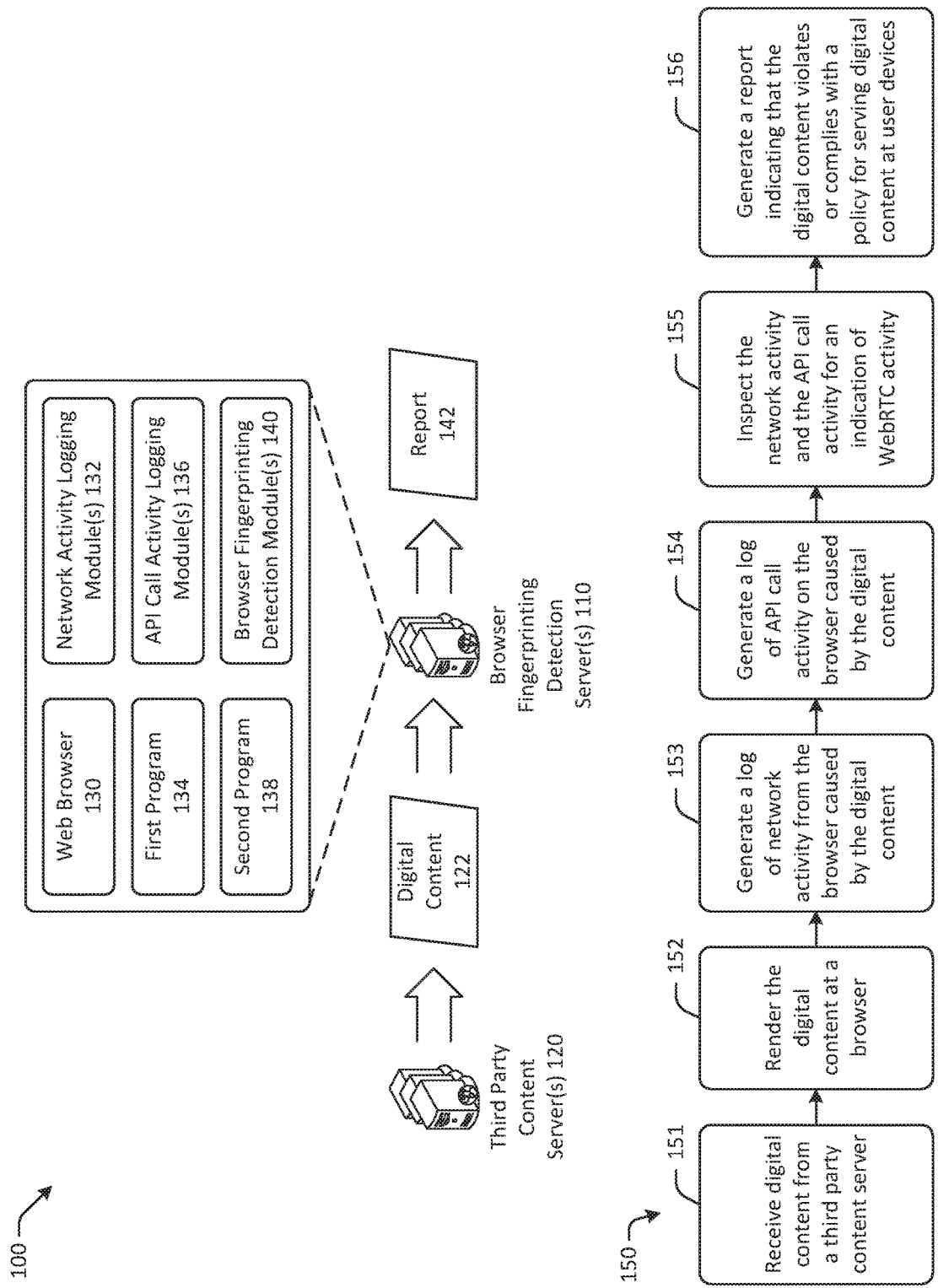
FIG. 1 is a hybrid system and process diagram illustrating detecting digital content performing browser fingerprinting using web real-time communication (WebRTC) in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Digital content may be presented at electronic user devices such that users can consume or interact with the digital content. For example, digital content may be presented at a webpage of a website controlled by a content publisher. Digital content for presentation at user devices may include various types of content such as text, images, videos, audio, program code, and other content for consumption by users and/or execution at user devices. In many instances, multiple pieces of digital content may be presented at respective content delivery slots of a particular webpage. For example, a user may access a webpage by executing a web browser on a user device, and a variety of digital content may be delivered to the web browser for presentation at different delivery slots of the webpage. In certain instances, some of the digital content may be controlled and hosted by a content publisher for the webpage, while other digital content may be controlled and hosted by a third party. In such instances, the content publisher may scan the third-party digital content before such content is served at user devices. Specifically, the content publisher may scan the third-party digital content to determine whether the third-party digital content complies with one or more policies for serving digital content at user devices. Such policies often may relate to inhibiting risks to the privacy or security of users to which the digital content is presented. For example, the third-party digital content may be scanned to identify attempts to serve malware to user devices or leak user data to third parties.

Techniques for scanning digital content generally may include retrieving the digital content, rendering the digital content in a virtual environment, gathering data on the uniform resource locators (URLs) loaded, and running checks on the URL data to determine compliance or non-compliance with certain policies. For example, the digital content may be received from a content server, such as a third-party content server, and rendered at a sandbox web browser executing in a virtual machine. All hypertext transfer protocol (HTTP) activity may be recorded and reviewed to determine whether the destinations accessed by the digital content are permitted or restricted by the policies. However, such scanning techniques may not be able to detect certain privacy or security risks, such as digital content implementing code to perform browser fingerprinting.

In certain contexts, third-party sources of digital content often may desire to collect information about particular user devices and the users of such devices. For example, online advertisers may seek to identify a particular user for the purpose of tracking the user's online activity and targeting advertisements served at the user's device. Web cookies commonly have been used by advertisers and other entities to track online user behavior and target digital content to provide customized user experiences. However, the reliability of web cookies generally has declined in view of users frequently deleting cookies stored on their devices, certain browsers limiting the use of cookies, and certain ad blockers inhibiting the use of cookies. As a result, alternative methods for uniquely identifying users and tracking user browsing behavior have been developed. Browser fingerprinting is one technique that may be used to identify unique browsers and track online activity. By implementing browser fingerprinting to collect information relating to particular browsers and online activity, websites can identify users over time and build unique profiles for respective users. The information collected by browser fingerprinting may include various data points, such as internet protocol (IP) addresses (private and public IP addresses), browser type, browser version, operating system, active plug-ins, time zone, language, screen resolution, media devices accessible to the browser, and other active settings, and the combination of such data points may be sufficient to identify unique users and track their online behavior.

Web real-time communication (WebRTC) is a standardized real-time communication protocol stack that may be used to collect information for browser fingerprinting. WebRTC enables peer-to-peer real-time exchange of audio, video, and data between two endpoints (i.e., client devices) implementing WebRTC. Interactive connectivity establishment (ICE) is one of the protocols of the WebRTC stack, which allows the endpoints to exchange media regardless of any network address translators (NATs) that exist in between the endpoints. ICE is a framework that allows WebRTC to overcome the NAT traversal problem and determine a path to connect the endpoints. In particular, ICE uses two other protocols—a session traversal utilities for NAT (STUN) protocol and a traversal using relay NAT (TURN) protocol—to determine the shortest path for media exchange between the endpoints. The TURN protocol is an extension to the STUN protocol. In some instances, such as when an asymmetric NAT is present. ICE may use a STUN server to connect the endpoints. The STUN server may allow the endpoints to discover their public IP addresses and port numbers as well as the type of NAT that they are behind, and this information may be used to establish the media connection between the endpoints. The STUN server generally may be used during establishment of the connection, after which media may flow directly between the endpoints. In other instances, such as when a symmetric NAT is present and a STUN server cannot establish a connection. ICE may use a TURN server to connect the endpoints. The TURN server may connect the endpoints and operate as an intermediate server to exchange media between the endpoints. In this manner, the TURN server may remain in the media path after the connection between the endpoints has been established.

As described above, existing techniques for scanning digital content for compliance with policies for serving digital content at user devices generally may be focused on web activity. In particular, such scans may record HTTP activity and determine whether the destinations accessed by the digital content are permitted or restricted by the policies. In this manner, these scanning techniques may not record or determine other protocol stack activity, such as WebRTC activity caused by the digital content. As a result, information collection attempted or achieved using WebRTC may not be detected using existing scanning techniques.

In order to enhance protection of end users from privacy and security risks related to browser fingerprinting, content publishers and other related entities may desire to implement additional techniques for scanning digital content to identify attempted collection of information that may be used to fingerprint a user's browser.

Embodiments of the disclosure may provide improved techniques for scanning digital content to identify attempted collection of information that may be used for browser fingerprinting, thereby protecting end users from undesirable privacy and security risks. Certain embodiments may determine a policy for serving digital content at user devices. For example, the policy may relate to preventing collection of IP addresses, a list of media devices accessible to a browser, or other information that may be used for browser fingerprinting. Some embodiments may receive digital content from a content server. For example, the digital content may be received from a third-party content server or a local content server. Certain embodiments may render the digital content at a browser. For example, the digital content may be rendered at a sandbox browser executing in a virtual machine. Some embodiments may generate a log of network activity originating from the browser and caused by the digital content. For example, a first program installed on or provided to the virtual machine may be used to generate the log of network activity originating from the browser and caused by the digital content. Certain embodiments may generate a log of application programming interface (API) call activity on the browser caused by the digital content. For example, a second program installed on or provided to the virtual machine may be used to generate the log of API call activity on the browser caused by the digital content. Some embodiments may determine that at least one of the network activity and the API call activity is indicative of WebRTC activity associated with attempted collection of IP addresses related to the browser. For example, it may be determined that the network activity is indicative of an attempt to send a network packet from the browser to a known STUN server or a known TURN server. Alternatively, it may be determined that content of the network activity uses a STUN protocol or a TURN protocol. As another example, it may be determined that the API call activity is indicative of an attempt to call an API of the WebRTC protocol stack, such as an RTCPeerConnection API or a MediaDevices API. Certain embodiments may generate a report indicating that the digital content violates the policy for serving digital content at user devices. As a result, embodiments of the disclosure may provide enhance protection of end users from privacy and security risks related to browser fingerprinting.

Certain embodiments may receive digital content from a content server and render the digital content at a browser. For example, the digital content may be received from a third-party content server or a local content server and rendered at a sandbox browser executing in a virtual machine. Some embodiments may determine network activity originating from the browser and caused by the digital content. For example, a first program installed on or provided to the virtual machine may be used to determine the network activity originating from the browser and caused by the digital content. Certain embodiments may determine that the network activity comprises WebRTC activity. Some embodiments may determine that the WebRTC activity is indicative of an attempt to collect IP addresses related to the browser. Certain embodiments may determine that the network activity is indicative of network activity from the browser to a known port address. Some embodiments may determine that the network activity is indicative of an attempt to send a network packet from the browser to a STUN server or a TURN server. Certain embodiments may determine that content of the network activity uses a STUN protocol or a TURN protocol. Some embodiments may generate a report indicating that the digital content violates the policy for serving digital content at user devices.

Certain embodiments may receive digital content from a content server and render the digital content at a browser. For example, the digital content may be received from a third-party content server or a local content server and rendered at a sandbox browser executing in a virtual machine. Some embodiments may determine API call activity on the browser caused by the digital content. For example, a second program installed on or provided to the virtual machine may be used to determine the API call activity on the browser caused by the digital content. Certain embodiments may determine that the API call activity comprises WebRTC API call activity. Some embodiments may determine that the WebRTC call activity is indicative of an attempt to collect IP addresses related to the browser. Certain embodiments may determine that the API call activity is indicative of an attempt to call an RTCPeerConnection API of the WebRTC protocol stack. Some embodiments may determine that the API call activity is indicative of an attempt to collect a list of media devices accessible to the browser. Certain embodiments may determine that the API call activity is indicative of an attempt to call a MediaDevices API of the WebRTC protocol stack. Certain embodiments may determine that the API call activity is indicative of an attempt to carry out an enumerateDevices method of the MediaDevices API. Some embodiments may generate a report indicating that the digital content violates the policy for serving digital content at user devices.

Referring to FIG. 1, an example system 100 illustrating detecting digital content performing browser fingerprinting using WebRTC is depicted in accordance with one or more example embodiments of the disclosure. In the example of FIG. 1, one or more browser fingerprinting detection server(s) 110 may be used to detect or otherwise identify digital content performing browser fingerprinting using WebRTC. Digital content may be received by the browser fingerprinting detection server 110 from one or more third parties. In some embodiments, the digital content may be one or more advertisements for presentation at user devices. For example, a user may access a webpage by executing a web browser on a user device, and the one or more advertisements may be delivered to the web browser for presentation at one or more delivery slots of the webpage.

In the example of FIG. 1, the browser fingerprinting detection server 110 may receive digital content 122 from one or more third party content server(s) 120. The browser fingerprinting detection server 110 may receive a plurality of different pieces of digital content 122 from one or a plurality of different third party content servers 120. The browser fingerprinting detection server 110 may receive the digital content 122 prior to the digital content 122 being served at user devices. In some embodiments, the digital content 122 may be received from the third party content server 120, stored at a local content server associated with the browser fingerprinting detection server 110, and subsequently provided by the local content server to the browser fingerprinting detection server 110. The digital content 122 may include various types of content such as text, images, videos, audio, program code, and/or other content for consumption by users and/or execution at user devices.

The browser fingerprinting detection server 110 may be configured to determine or otherwise identify digital content performing browser fingerprinting using WebRTC. For example, the browser fingerprinting detection server 110 may be configured to scan the digital content 122 to determine whether the digital content 122 performs browser fingerprinting using WebRTC. In the example of FIG. 1, the browser fingerprinting detection server 110 may include a web browser 130 for rendering digital content. For example, the web browser 130 may be used to render the digital content 122. In some embodiments, the web browser 130 may be a sandbox web browser executing in a virtual machine. In the example of FIG. 1, the browser fingerprinting detection server 110 also may include one or more network activity logging module(s) 132 for generating and storing a log of network activity originating from the web browser 130 and caused by the digital content 122. In some embodiments, a first program 134 installed at the browser fingerprinting detection server 110 may be used to identify network activity originating from the web browser 130 and caused by the digital content 122 and cause the network activity logging module 132 to generate and store a log of the network activity. In some embodiments, the network activity logging module 132 may generate and store a log of all network activity originating from the web browser 130 and caused by the digital content 122. In some embodiments, the network activity logging module 132 may generate and store a log of only WebRTC activity originating from the web browser 130 and caused by the digital content 122. In the example of FIG. 1, the browser fingerprinting detection server 110 also may include one or more API call activity logging module(s) 136 for generating a log of API call activity on the web browser 130 caused by the digital content 122. In some embodiments, a second program 138 installed at or provided to the browser fingerprinting detection server 110 may be used to identify API call activity on the web browser 130 caused by the digital content 122 and cause the API call activity logging module 136 to generate a log of the API call activity. In some embodiments, the second program 138 may be a plug-in program installed on the web browser 130. In some embodiments, the API call activity logging module 136 may generate and store a log of all API call activity on the web browser 130 caused by the digital content 122. In some embodiments, the API call activity logging module 136 may generate and store a log of only WebRTC API call activity on the web browser 130 caused by the digital content 122. In the example of FIG. 1, the browser fingerprinting detection server 110 also may include one or more browser fingerprinting detection module(s) 140 for detecting digital content performing browser fingerprinting using WebRTC. In some embodiments, the browser fingerprinting detection module 140 may use the network activity to determine that the digital content 122 performs browser fingerprinting using WebRTC. In some embodiments, the browser fingerprinting detection module 140 may use the API call activity to determine that the digital content 122 performs browser fingerprinting using WebRTC. In some embodiments, the browser fingerprinting detection module 140 may use the network activity and the API call activity to determine that the digital content 122 performs browser fingerprinting using WebRTC.

To detect digital content performing browser fingerprinting using WebRTC, the browser fingerprinting detection server 110 may execute one or more process flows. An example process flow 150 for detecting digital content performing browser fingerprinting using WebRTC is depicted in FIG. 1. The browser fingerprinting detection server 110 may include at least one memory that stores computer-executable instructions and at least one processor configured to access the at least one memory and execute the computer-executable instructions to perform various actions or operations, such as one or more of the operations of the process flow 150.

At block 151, the browser fingerprinting detection server 110 may receive digital content from a third party content server. For example, the browser fingerprinting detection server 110 may receive the digital content 122 from the third party content server 120. In some embodiments, the digital content 122 may be an advertisement, and the third party content server 120 may be a third party advertisement server. The digital content 122 may be received by the browser fingerprinting detection server 110 prior to the digital content 122 being served at user devices.

At block 152, the browser fingerprinting detection server 110 may render the digital content at a browser. For example, the browser fingerprinting detection server 110 may render the digital content 122 at the web browser 130. In some embodiments, the web browser 130 may be a sandbox web browser.

At block 153, the browser fingerprinting detection server 110 may generate a log of network activity originating from the browser and caused by the digital content. For example, the first program 134 may identify network activity and cause the network activity logging module 132 to generate and store a log of the network activity originating from the web browser 130 and caused by the digital content 122. In some embodiments, the network activity logging module 132 may generate and store a log of all network activity originating from the web browser 130 and caused by the digital content 122. In some embodiments, the network activity logging module 132 may generate and store a log of only WebRTC activity originating from the web browser 130 and caused by the digital content 122.

At block 154, the browser fingerprinting detection server 110 may generate a log of API call activity on the browser caused by the digital content. For example, the second program 138 may intercept API call activity and cause the API call activity logging module 134 to generate and store a log of the API call activity on the web browser 130 caused by the digital content 122. In some embodiments, the API call activity logging module 134 may generate and store a log of all API call activity on the web browser 130 caused by the digital content 122. In some embodiments, the API call activity logging module 134 may generate and store a log of only WebRTC API call activity on the web browser 130 caused by the digital content 122. In some embodiments, the second program 138 may be a plug-in program installed at the web browser 130 for causing the API call activity logging module 134 to generate and store a log of the API call activity on the web browser 130 caused by the digital content 122.

At block 155, the browser fingerprinting detection server 110 may inspect the network activity and the API call activity for an indication of WebRTC activity. For example, the browser fingerprinting detection module 140 may inspect the network activity and the API call activity for an indication of WebRTC activity caused by the digital content 122. In some embodiments, the browser fingerprinting detection module may determine that at least one of the network activity and the API call activity is indicative of WebRTC activity, such as WebRTC activity associated with attempted collection of IP addresses related to the browser or attempted collection of a list of media devices accessible to the web browser 130. In some embodiments, the browser fingerprinting detection module may determine that the network activity is indicative of WebRTC activity associated with attempted collection of IP addresses related to the web browser 130. In some embodiments, the browser fingerprinting detection module 142 may determine that the network activity is indicative of an attempt to send a network packet from the web browser 130 to a known port address. In some embodiments, the browser fingerprinting detection module 140 may determine that the network activity is indicative of an attempt to send a network packet from the web browser 130 to a known STUN server or a known TURN server. In some embodiments, the browser fingerprinting detection module 140 may determine that the network activity is not indicative of an attempt to send a network packet from the web browser 130 to a known STUN server or a known TURN server. In such embodiments, the browser fingerprinting detection module 140 may inspect content of the network activity and determine that the content of the network activity uses a STUN protocol or a TURN protocol.

In some embodiments, the browser fingerprinting detection module 140 may determine that the API call activity is indicative of WebRTC API call activity associated with attempted collection of IP addresses related to the browser 130. In some embodiments, the browser fingerprinting detection module 140 may determine that the API call activity comprises WebRTC API call activity. In some embodiments, the browser fingerprinting detection module 140 may determine that the API call activity is indicative of an attempt to call an RTCPeerConnection API of the WebRTC protocol stack. The RTCPeerConnection API is an interface used to establish peer-to-peer connections, which provides the capability to collect a set of IP addresses (public IP address and private IP address). The IP addresses are collected through the ICE protocol that is used to establish peer-to-peer connections across firewalls and/or NATs. In some embodiments, the browser fingerprinting detection module 140 may determine that the API call activity is indicative of an attempt to call a MediaDevices API of the WebRTC protocol stack. The MediaDevices API is an interface that provides access to connected media devices. In some embodiments, the browser fingerprinting detection module 140 may determine that the API call activity is indicative of an attempt to carry out an enumerateDevices method of the MediaDevices API. The enumerateDevices method is a method for requesting and generating a list of media input and output devices (e.g., microphones, cameras, headsets, etc.) accessible to a browser. In some embodiments, the browser fingerprinting detection module 140 may determine that the network activity and the API call activity both are indicative of WebRTC activity.

At block 156, the browser fingerprinting detection server 110 may generate a report indicating that the digital content violates or complies with a policy for serving digital content at user devices. For example, the browser fingerprinting detection server 110 may generate a report 142 indicating that the digital content 122 violates or complies with a policy for serving digital content at user devices. In some embodiments, the policy may relate to preventing collection of IP addresses, a list of media devices accessible to a browser, or other information that may be used for browser fingerprinting. In some embodiments, the report 142 may indicate that the digital content 122 violates the policy, and thus the digital content 122 may not be served at user devices. In some embodiments, the report 142 may indicate that the digital content 122 complies with the policy, and thus the digital content 122 may be served at user devices.

By implementing the process of receiving digital content from a content server, rendering the digital content at a browser, generating a log of network activity originating from the browser and caused by the digital content, generating a log of API call activity on the browser caused by the digital content, inspecting the network activity and the API call activity for an indication of WebRTC activity, and generating a report indicating that the digital content violates or complies with a policy for serving digital content at user devices, embodiments of the disclosure may provide improved techniques for scanning digital content to identify attempted collection of information that may be used for browser fingerprinting, thereby protecting end users from undesirable privacy and security risks.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
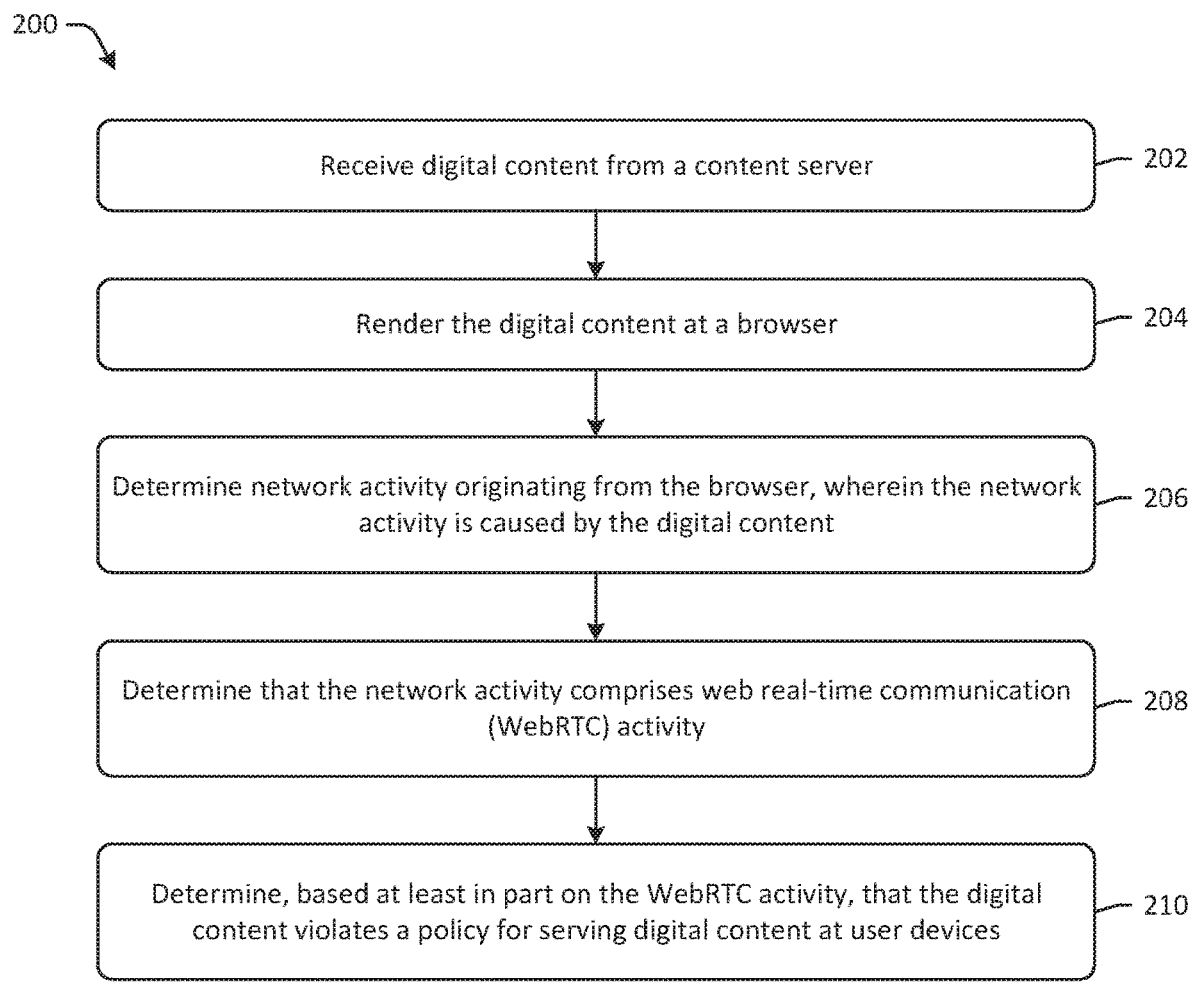
FIG. 2 is an example process flow diagram for identifying and using network activity to detect digital content performing browser fingerprinting using WebRTC in accordance with one or more embodiments of the disclosure.

Referring to FIG. 2, an example process flow 200 for detecting digital content performing browser fingerprinting using WebRTC in accordance with one or more embodiments of the disclosure is depicted. Although certain operations are illustrated as occurring separately in FIG. 2, some or all of the operations may occur concurrently or partially concurrently across one or more computer systems. In some embodiments, the operations of the process flow 200 may be executed by a remote server, such as a browser fingerprinting detection server.

At block 202 of the process flow 200, digital content may be received from a content server. For example, computer-executable instructions of one or more browser fingerprinting detection module(s) stored at a server may be executed to receive digital content from a content server. In some embodiments, the digital content may be an advertisement. In some embodiments, the content server may be a third party content server. In some embodiments, the digital content may be received prior to the digital content being served at user devices.

At block 204 of the process flow 200, the digital content may be rendered at a browser. For example, computer-executable instructions of one or more browser fingerprinting detection module(s) stored at a server may be executed to render the digital content at a browser. In some embodiments, the browser may be a sandbox web browser executing in a virtual machine.

At block 206 of the process flow 200, network activity originating from the browser may be determined, wherein the network activity is caused by the digital content. For example, computer-executable instructions of one or more browser fingerprinting detection module(s) or one or more network activity logging module(s) stored at a server may be executed to determine network activity originating from the browser, wherein the network activity is caused by the digital content.

At block 208 of the process flow 200, it may be determined that the network activity comprises WebRTC activity. For example, computer-executable instructions of one or more browser fingerprinting detection module(s) or one or more network activity logging module(s) stored at a server may be executed to determine that the network activity comprises WebRTC activity.

At block 210 of the process flow 200, it may be determined that the digital content violates a policy for serving digital content at user devices, based at least in part on the WebRTC activity. For example, computer-executable instructions of one or more browser fingerprinting detection module(s) stored at a server may be executed to determine, based at least in part on the WebRTC activity, that the digital content violates a policy for serving digital content at user devices.

Figure 3:
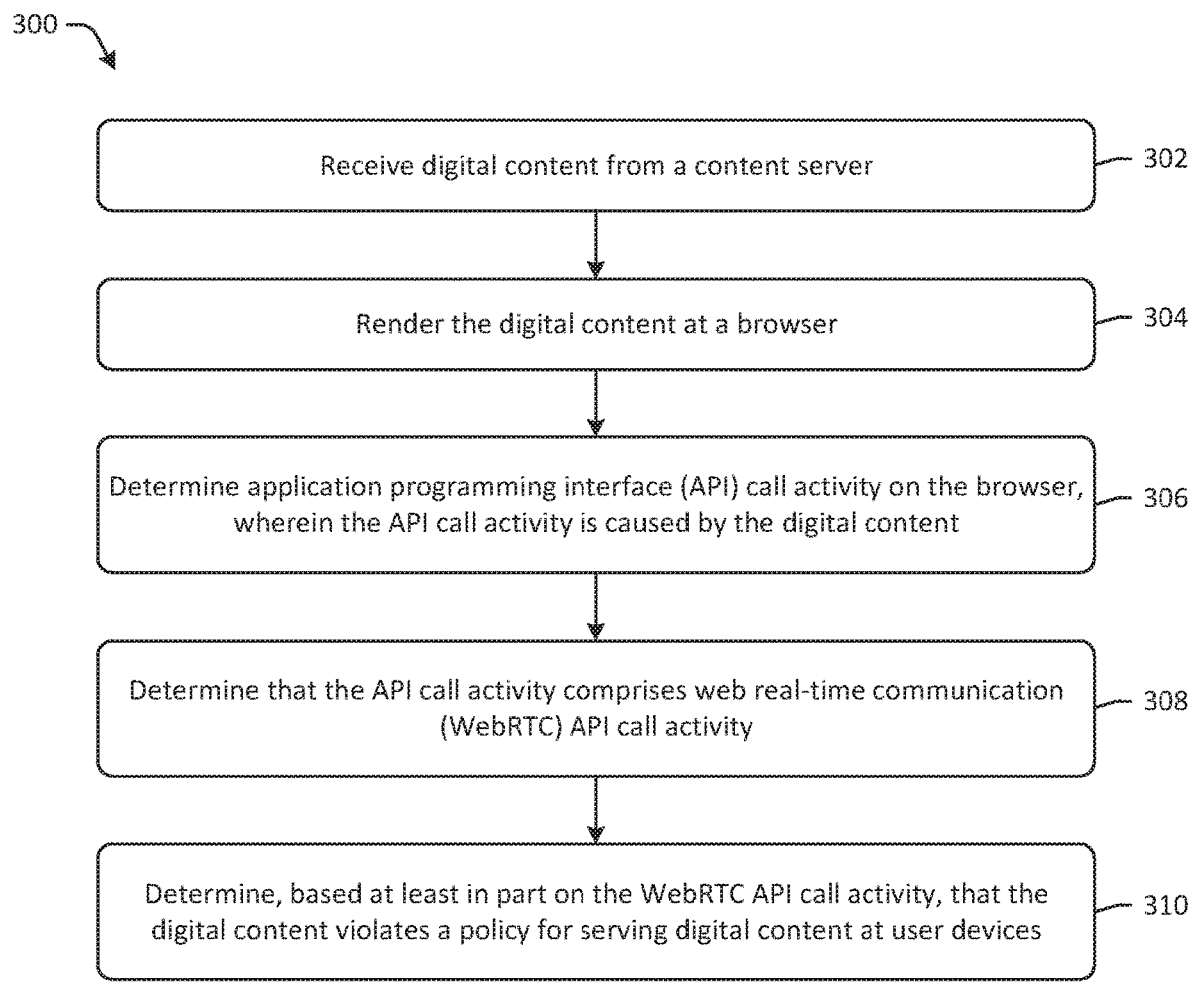
FIG. 3 is an example process flow diagram for identifying and using application programming interface (API) call activity to detect digital content performing browser fingerprinting using WebRTC in accordance with one or more embodiments of the disclosure.

Referring to FIG. 3, an example process flow 300 for detecting digital content performing browser fingerprinting using WebRTC in accordance with one or more embodiments of the disclosure is depicted. Although certain operations are illustrated as occurring separately in FIG. 3, some or all of the operations may occur concurrently or partially concurrently across one or more computer systems. In some embodiments, the operations of the process flow 300 may be executed by a remote server, such as a browser fingerprinting detection server.

At block 302 of the process flow 300, digital content may be received from a content server. For example, computer-executable instructions of one or more browser fingerprinting detection module(s) stored at a server may be executed to receive digital content from a content server. In some embodiments, the digital content may be an advertisement. In some embodiments, the content server may be a third party content server. In some embodiments, the digital content may be received prior to the digital content being served at user devices.

At block 304 of the process flow 300, the digital content may be rendered at a browser. For example, computer-executable instructions of one or more browser fingerprinting detection module(s) stored at a server may be executed to render the digital content at a browser. In some embodiments, the browser may be a sandbox web browser executing in a virtual machine.

At block 306 of the process flow 300, API call activity on the browser may be determined, wherein the API call activity is caused by the digital content. For example, computer-executable instructions of one or more browser fingerprinting detection module(s) or one or more API call activity logging module(s) stored at a server may be executed to determine API call activity on the browser, wherein the API call activity is caused by the digital content.

At block 308 of the process flow 300, it may be determined that the API call activity comprises WebRTC API call activity. For example, computer-executable instructions of one or more browser fingerprinting detection module(s) or one or more API call activity logging module(s) stored at a server may be executed to determine that the API call activity comprises WebRTC API call activity.

At block 310 of the process flow 300, it may be determined that the digital content violates a policy for serving digital content at user devices, based at least in part on the WebRTC API call activity. For example, computer-executable instructions of one or more browser fingerprinting detection module(s) stored at a server may be executed to determine, based at least in part on the WebRTC API call activity, that the digital content violates a policy for serving digital content at user devices.

Figure 4:
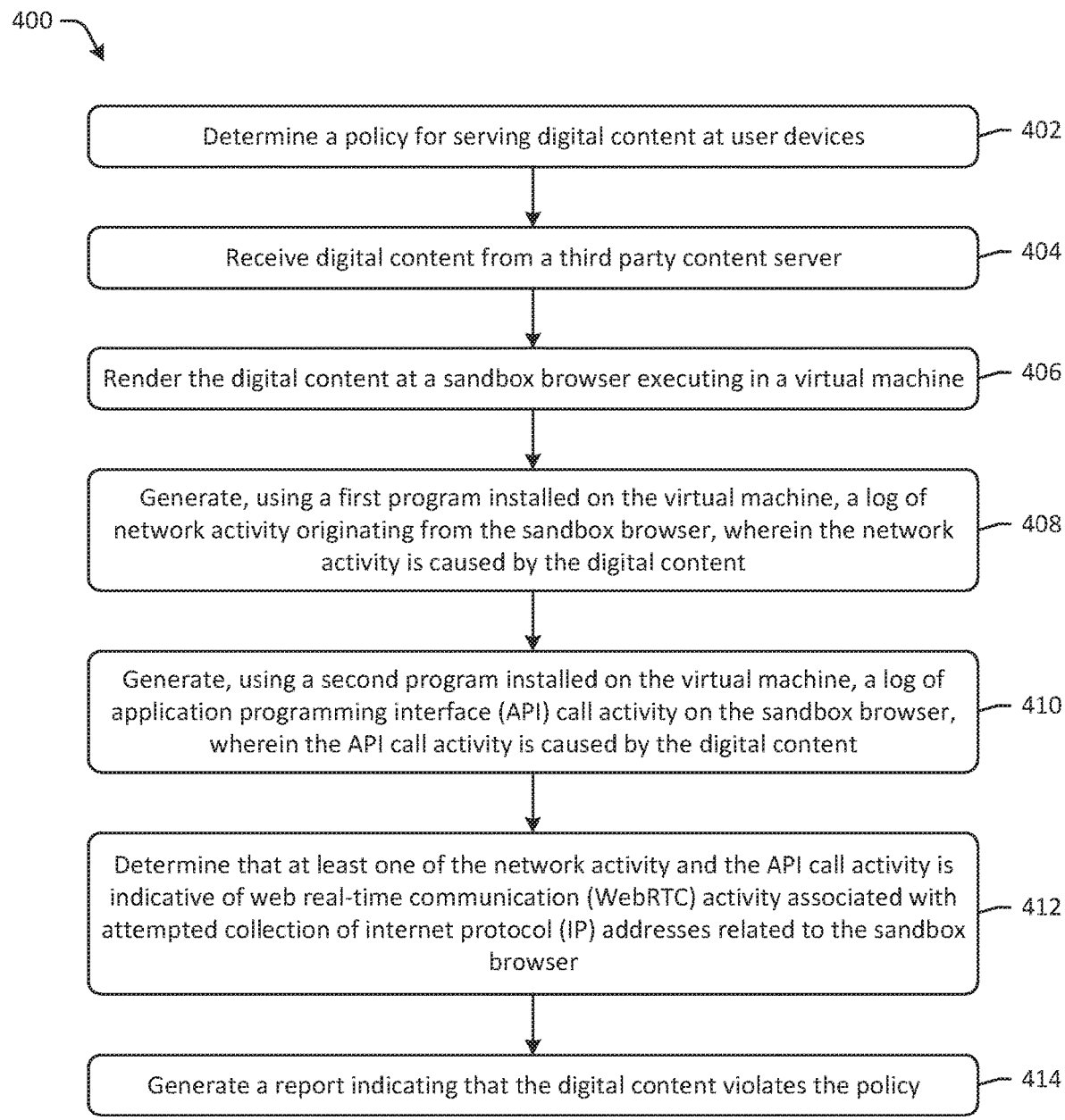
FIG. 4 is an example process flow diagram for detecting digital content performing browser fingerprinting using WebRTC.

Referring to FIG. 4, an example process flow 400 for detecting digital content performing browser fingerprinting using WebRTC in accordance with one or more embodiments of the disclosure is depicted. Although certain operations are illustrated as occurring separately in FIG. 4, some or all of the operations may occur concurrently or partially concurrently across one or more computer systems. In some embodiments, the operations of the process flow 400 may be executed by a remote server, such as a browser fingerprinting detection server.

At block 402 of the process flow 400, a policy for serving digital content at user devices may be determined. For example, computer-executable instructions of one or more browser fingerprinting detection module(s) stored at a server may be executed to determine a policy for serving digital content at user devices. In some embodiments, the policy may relate to preventing collection of IP addresses, a list of media devices accessible to a browser, or other information that may be used for browser fingerprinting.

At block 404 of the process flow 400, digital content may be received from a third party content server. For example, computer-executable instructions of one or more browser fingerprinting detection module(s) stored at a server may be executed to receive digital content from a third party content server. In some embodiments, the digital content may be an advertisement. In some embodiments, the digital content may be received prior to the digital content being served at user devices.

At block 406 of the process flow 400, the digital content may be rendered at a sandbox browser executing in a virtual machine. For example, computer-executable instructions of one or more browser fingerprinting detection module(s) stored at a server may be executed to render the digital content at a sandbox browser executing in a virtual machine.

At block 408 of the process flow 400, a log of network activity from the sandbox browser may be generated, wherein the network activity is caused by the digital content. For example, computer-executable instructions of one or more browser fingerprinting detection module(s) or one or more network activity logging module(s) stored at a server may be executed to generate a log of network activity from the sandbox browser, wherein the network activity is caused by the digital content. The log of network activity may be generated using a first program installed on the virtual machine.

At block 410 of the process flow 400, a log of API call activity on the sandbox browser may be generated, wherein the API call activity is caused by the digital content. For example, computer-executable instructions of one or more browser fingerprinting detection module(s) or one or more API call activity logging module(s) stored at a server may be executed to generate a log of API call activity on the sandbox browser, wherein the API call activity is caused by the digital content. The log of API call activity may be generated using a second program installed on the virtual machine. In some embodiments, the second program may be a plug-in program installed on the sandbox browser At block 412 of the process flow 400, it may be determined that at least one of the network activity and the API call activity is indicative of WebRTC activity associated with attempted collection of IP addresses related to the sandbox browser. For example, computer-executable instructions of one or more browser fingerprinting detection module(s), one or more network activity logging module(s), or one or more API call activity logging module(s) may be executed to determine that at least one of the network activity and the API call activity is indicative of WebRTC activity associated with attempted collection of IP addresses related to the sandbox browser.

At block 414 of the process flow 400, a report indicating that the digital content violates the policy may be generated. For example, computer-executable instructions of one or more browser fingerprinting detection module(s) stored at a server may be executed to generate a report indicating that the digital content violates the policy.

One or more operations of the methods, process flows, or use cases of FIGS. 1-4 may have been described above as being performed by a user device, or more specifically, by one or more program module(s), applications, or the like executing on a device. It should be appreciated, however, that any of the operations of methods, process flows, or use cases of FIGS. 1-4 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-4 may be described in the context of the illustrative devices, it should be appreciated that such operations may be implemented in connection with numerous other device configurations.

The operations described and depicted in the illustrative methods, process flows, and use cases of FIGS. 1-4 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-4 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 5:
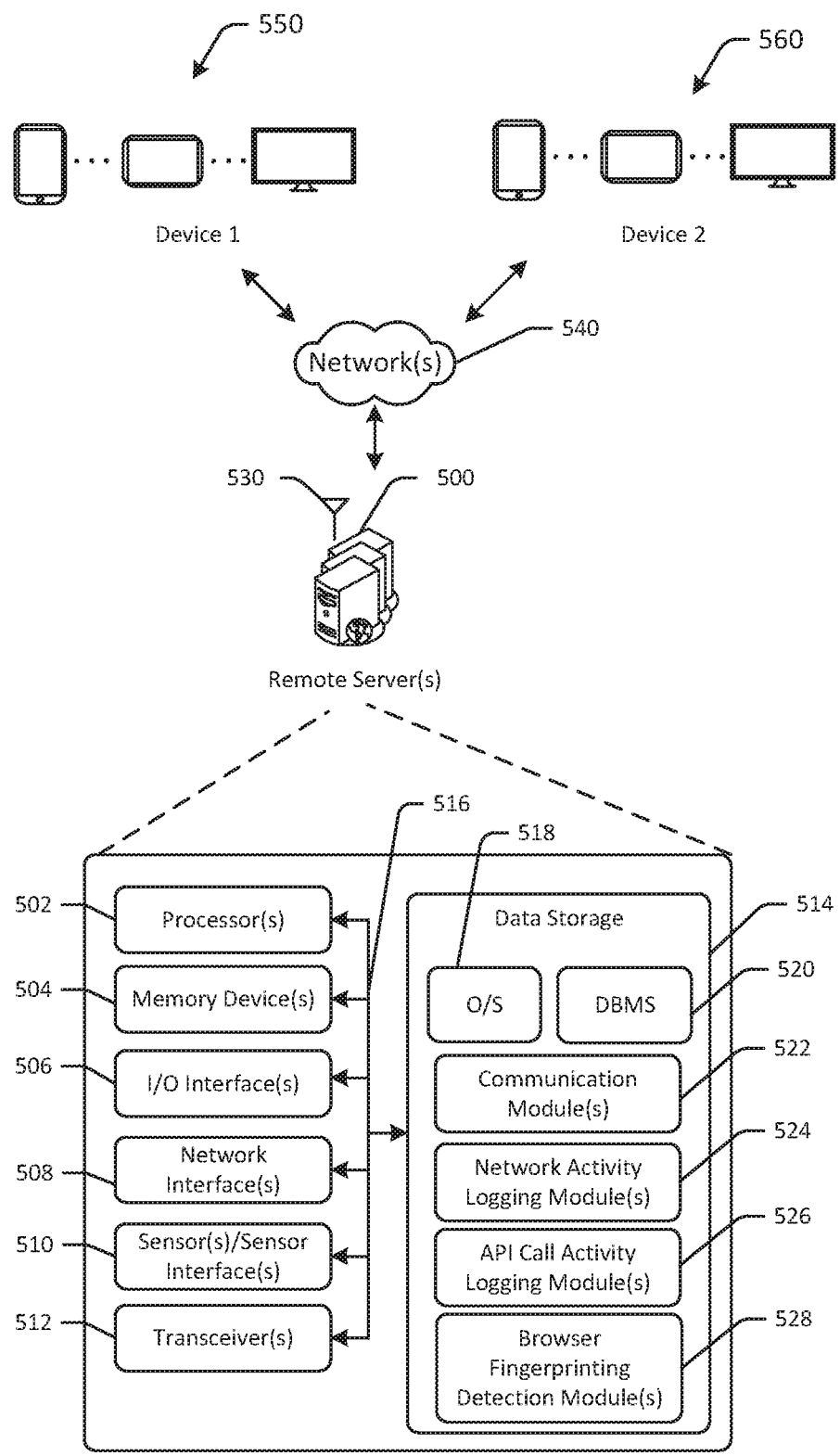
FIG. 5 schematically illustrates an example architecture of a system in accordance with one or more embodiments of the disclosure.

FIG. 5 is a schematic block diagram of one or more illustrative remote server(s) 500 in accordance with one or more example embodiments of the disclosure. The remote server(s) 500 may include any suitable computing device including, but not limited to, a server system, a mobile device such as a smartphone, a tablet, an e-reader, a wearable device, or the like; a desktop computer; a laptop computer; a content streaming device; a set-top box; or the like. The remote server(s) 500 may correspond to an illustrative device configuration for the browser fingerprinting detection server(s) of FIGS. 1-4.

The remote server(s) 500 may be configured to communicate via one or more networks with one or more servers, user devices, or the like. The remote server(s) 500 may be configured to manage one or more aspects of a number of content campaigns, such as content delivery parameters, distribution of content for presentation at respective delivery slots at a webpage or in an application, and other operations. The remote server(s) 500 may be configured to deliver or cause delivery of instructions and/or one or more pieces of content and may further be configured to receive digital content from a content server, render the digital content at a browser, generate a log of network activity from the browser caused by the digital content, generate a log of API call activity on the browser caused by the digital content, inspect the network activity and the API call activity for an indication of WebRTC activity, and generate a report indicating that the digital content violates or complies with a policy for serving digital content at user devices. In some embodiments, a single remote server or single group of remote servers may be configured to perform more than one type of content delivery functionality.

The remote server(s) 500 may be configured to communicate via one or more networks 540. Such network(s) 540 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) 540 may have any suitable communication range associated therewith and may include, for example, global networks (e.g., the Internet), metropolitan area networks (MANs), wide area networks (WANs), local area networks (LANs), or personal area networks (PANs). In addition, such network(s) 540 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In FIG. 5, the remote server(s) 500 may communicate with one or more user devices via the network(s) 540. For example, the remote server(s) 500 may communicate with a first user device 550 via the network(s) 540 when the first user device 550 is connected to the network(s) 540. Likewise, the remote server(s) 500 may communicate with a second user device 560 via the network(s) 540 when the second user device 560 is connected to the network(s) 540. The remote server(s) 500 may communicate with any number of semi-connected devices.

In an illustrative configuration, the remote server(s) 500 may include one or more processors (processor(s)) 502, one or more memory devices 504 (also referred to herein as memory 504), one or more input/output ("I/O") interface(s) 506, one or more network interface(s) 508, one or more sensors or sensor interface(s) 510, one or more transceivers 512, and data storage 514. The remote server(s) 500 may further include one or more buses 516 that functionally couple various components of the remote server(s) 500. The remote server(s) 500 may further include one or more antenna(e) 530 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 516 may include at least one of a system bus, a memory bus, an address bus, or a message bus, and may permit the exchange of information (e.g., data (including computer-executable code), signaling, etc.) between various components of the remote server(s) 500. The bus(es) 516 may include, without limitation, a memory bus or a memory controller, a peripheral bus, an accelerated graphics port, and so forth. The bus(es) 516 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 504 of the remote server(s) 500 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth.

Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 504 may include multiple different types of memory such as various types of static random access memory (SRAM), various types of dynamic random access memory (DRAM), various types of unalterable ROM, and/or writeable variants of ROM such as electrically erasable programmable read-only memory (EEPROM) flash memory, and so forth. The memory 504 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 514 may include removable storage and/or non-removable storage including, but not limited to, magnetic storage, optical disk storage, and/or tape storage. The data storage 514 may provide non-volatile storage of computer-executable instructions and other data. The memory 504 and the data storage 514, removable and/or non-removable, are examples of computer-readable storage media (CRSM) as that term is used herein.

The data storage 514 may store computer-executable code, instructions, or the like that may be loadable into the memory 504 and executable by the processor(s) 502 to cause the processor(s) 502 to perform or initiate various operations. The data storage 514 may additionally store data that may be copied to the memory 504 for use by the processor(s) 502 during the execution of the computer-executable instructions. Moreover, output data generated as a result of execution of the computer-executable instructions by the processor(s) 502 may be stored initially in the memory 504, and may ultimately be copied to data storage 514 for non-volatile storage.

More specifically, the data storage 514 may store one or more operating systems (O/S) 518; one or more database management systems (DBMS) 520; and one or more program module(s), applications, engines, computer-executable code, scripts, or the like such as, for example, one or more communication module(s) 522, one or more network activity logging module(s) 524, one or more API call activity logging module(s) 526, and/or one or more browser fingerprinting detection module(s) 528. Some or all of these module(s) may be or include sub-module(s). Any of the components depicted as being stored in data storage 514 may include any combination of software, firmware, and/or hardware. The software and/or firmware may include computer-executable code, instructions, or the like that may be loaded into the memory 504 for execution by one or more of the processor(s) 502. Any of the components depicted as being stored in data storage 514 may support the functionality described in reference to the corresponding components named earlier in this disclosure.

The data storage 514 may further store various types of data utilized by the components of the remote server(s) 500. Any data stored in the data storage 514 may be loaded into the memory 504 for use by the processor(s) 502 in executing computer-executable code. In addition, any data depicted as being stored in the data storage 514 may potentially be stored in one or more datastore(s) and may be accessed via the DBMS 520 and loaded in the memory 504 for use by the processor(s) 502 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 5, an example datastore(s) may include, for example, product catalog information, transaction history information, product cost information, one or more expected performance models, one or more expected cost models, and/or other information.

The processor(s) 502 may be configured to access the memory 504 and execute computer-executable instructions loaded therein. For example, the processor(s) 502 may be configured to execute computer-executable instructions of the various program module(s), applications, engines, or the like of the remote server(s) 500 to cause or facilitate various operations to be performed in accordance with one or more embodiments of the disclosure. The processor(s) 502 may include any suitable processing unit capable of accepting data as input, processing the input data in accordance with stored computer-executable instructions, and generating output data. The processor(s) 502 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 502 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 502 may be capable of supporting any of a variety of instruction sets.

Referring now to functionality supported by the various program module(s) depicted in FIG. 5, the communication module(s) 522 may include computer-executable instructions, code, or the like that responsive to execution by one or more of the processor(s) 502 may perform functions including, but not limited to, communicating with remote servers, communicating with remote datastores, communicating with user devices, sending or receiving information and instructions, and the like.

The one or more network activity logging module(s) 524 may include computer-executable instructions, code, or the like that responsive to execution by one or more of the processor(s) 502 may perform functions including, but not limited to, generate a log of network activity from a browser caused by digital content rendered at the browser.

The one or more API call activity logging module(s) 526, may include computer-executable instructions, code, or the like that responsive to execution by one or more of the processor(s) 502 may perform functions including, but not limited to, generate a log of API call activity on a browser caused by digital content rendered at the browser.

The one or more browser fingerprinting detection module(s) 528 may include computer-executable instructions, code, or the like that responsive to execution by one or more of the processor(s) 502 may perform functions including, but not limited to, receive digital content from a content server, render the digital content at a browser, generate a log of network activity from the browser caused by the digital content, generate a log of API call activity on the browser caused by the digital content, inspect the network activity and the API call activity for an indication of WebRTC activity, and generate a report indicating that the digital content violates or complies with a policy for serving digital content at user devices.

Referring now to other illustrative components depicted as being stored in the data storage 514, the O/S 518 may be loaded from the data storage 514 into the memory 504 and may provide an interface between other application software executing on the remote server(s) 500 and the hardware resources of the remote server(s) 500. More specifically, the O/S 518 may include a set of computer-executable instructions for managing the hardware resources of the remote server(s) 500 and for providing common services to other application programs (e.g., managing memory allocation among various application programs). In certain example embodiments, the O/S 518 may control execution of the other program module(s) to dynamically enhance characters for content rendering. The O/S 518 may include any operating system now known or which may be developed in the future including, but not limited to, any server operating system, any mainframe operating system, or any other proprietary or non-proprietary operating system.

The DBMS 520 may be loaded into the memory 504 and may support functionality for accessing, retrieving, storing, and/or manipulating data stored in the memory 504 and/or data stored in the data storage 514. The DBMS 520 may use any of a variety of database models (e.g., relational model, object model, etc.) and may support any of a variety of query languages. The DBMS 520 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server(s) 500 is a mobile device, the DBMS 520 may be any suitable light-weight DBMS optimized for performance on a mobile device.

Referring now to other illustrative components of the remote server(s) 500, the input/output (I/O) interface(s) 506 may facilitate the receipt of input information by the remote server(s) 500 from one or more I/O devices as well as the output of information from the remote server(s) 500 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server(s) 500 or may be separate. The I/O devices may further include, for example, any number of peripheral devices such as data storage devices, printing devices, and so forth.

The I/O interface(s) 506 may also include an interface for an external peripheral device connection such as universal serial bus (USB), FireWire, Thunderbolt, Ethernet port or other connection protocol that may connect to one or more networks. The I/O interface(s) 506 may also include a connection to one or more of the antenna(e) 530 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, a WiMAX network, a 3G network, etc.

The remote server(s) 500 may further include one or more network interface(s) 508 via which the remote server(s) 500 may communicate with any of a variety of other systems, platforms, networks, devices, and so forth. The network interface(s) 508 may enable communication, for example, with one or more wireless routers, one or more host servers, one or more web servers, and the like via one or more networks.

The antenna(e) 530 may include any suitable type of antenna depending, for example, on the communications protocols used to transmit or receive signals via the antenna (e) 530. Non-limiting examples of suitable antennae may include directional antennae, non-directional antennae, dipole antennae, folded dipole antennae, patch antennae, multiple-input multiple-output (MIMO) antennae, or the like. The antenna(e) 530 may be communicatively coupled to one or more transceivers 512 or radio components to which or from which signals may be transmitted or received.

As previously described, the antenna(e) 530 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA). CDMA2000, etc.), 4G standards (e.g., Long-Term Evolution (LTE), WiMax, etc.), direct satellite communications, or the like.

The antenna(e) 530 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 530 may be configured to transmit or receive radio frequency signals within any suitable frequency range forming part of the unlicensed portion of the radio spectrum.

The antenna(e) 530 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 512 may include any suitable radio component(s) for—in cooperation with the antenna(e) 530—transmitting or receiving radio frequency (RF) signals in the bandwidth and/or channels corresponding to the communications protocols utilized by the remote server(s) 500 to communicate with other devices. The transceiver(s) 512 may include hardware, software, and/or firmware for modulating, transmitting, or receiving—potentially in cooperation with any of antenna(e) 530—communications signals according to any of the communications protocols discussed above including, but not limited to, one or more Wi-Fi and/or Wi-Fi direct protocols, as standardized by the IEEE 1002.11 standards, one or more non-Wi-Fi protocols, or one or more cellular communications protocols or standards. The transceiver(s) 512 may further include hardware, firmware, or software for receiving GNSS signals. The transceiver(s) 512 may include any known receiver and baseband suitable for communicating via the communications protocols utilized by the remote server(s) 500. The transceiver(s) 512 may further include a low noise amplifier (LNA), additional signal amplifiers, an analog-to-digital (A/D) converter, one or more buffers, a digital baseband, or the like.

The sensor(s)/sensor interface(s) 510 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program module(s), applications, computer-executable instructions, code, or the like depicted in FIG. 5 as being stored in the data storage 514 are merely illustrative and not exhaustive and that the processing described as being supported by any particular module may alternatively be distributed across multiple module(s) or performed by a different module. In addition, various program module(s), script(s), plug-in(s). Application Programming Interface(s) (API(s)), or any other suitable computer-executable code hosted locally on the remote server(s) 500, and/or hosted on other computing device(s) accessible via one or more networks, may be provided to support the functionality provided by the program module(s), applications, or computer-executable code depicted in FIG. 5 and/or additional or alternate functionality. Further, functionality may be modularized differently such that processing described as being supported collectively by the collection of program module(s) depicted in FIG. 5 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 5 may be implemented, at least partially, in hardware and/or firmware across any number of devices.

It should further be appreciated that the remote server(s) 500 may include alternate and/or additional hardware, software, or firmware components beyond those described or depicted without departing from the scope of the disclosure. More particularly, it should be appreciated that software, firmware, or hardware components depicted as forming part of the remote server(s) 500 are merely illustrative and that some components may not be present or additional components may be provided in various embodiments. While various illustrative program module(s) have been depicted and described as software module(s) stored in the data storage 514, it should be appreciated that the functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM. RAM. ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein. CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment. The term "based at least in part on" and "based on" are synonymous terms that may be used interchangeably herein.

That which is claimed is:

1. A method comprising:
    determining, by one or more computer processors coupled to at least one memory, a policy for serving digital content at user devices;
    receiving first digital content from a third party content server;
    rendering the first digital content at a sandbox browser executing in a virtual machine;
    generating, using a first program installed on the virtual machine, a log of first network activity originating from the sandbox browser, wherein the first network activity is caused by the first digital content;
    generating, using a second program installed on the virtual machine, a log of first application programming interface (API) call activity on the sandbox browser, wherein the first API call activity is caused by the first digital content;
    determining that the first API call activity comprises web real-time communication (WebRTC) API call activity;
    determining that the first network activity is indicative of an attempt to send a network packet from the sandbox browser to a known session traversal utilities for network address translation (STUN) server or a known traversal using relay network address translation (TURN) server; and
    generating a report indicating that the first digital content violates the policy.

2. The method of claim 1, further comprising:
    determining that content of the first network activity uses a STUN protocol or a TURN protocol.

3. The method of claim 1, wherein determining that the first API call activity is indicative of web real-time communication (WebRTC) activity comprises determining that the first API call activity is indicative of an attempt to call an RTCPeerConnection API of a WebRTC protocol stack.

4. A method comprising:
    receiving, by one or more computer processors coupled to at least one memory, first digital content from a content server;
    rendering the first digital content at a browser, wherein the browser is a sandbox browser;
    determining first network activity originating from the browser, wherein the first network activity is caused by the first digital content;
    determining that the first network activity is indicative of an attempt to send a network packet from the browser to a session traversal utilities for network address translation (STUN) server or a traversal using relay network address translation (TURN) server;
    determining first application programming interface (API) call activity on the browser, wherein the first API call activity is caused by the first digital content;
    determining that the first API call activity comprises web real-time communication (WebRTC) API call activity; and
    determining, based at least in part on the WebRTC API call activity and the WebRTC activity, that the first digital content violates a policy for serving digital content at user devices.

5. The method of claim 4, wherein determining the first API call activity on the browser comprises intercepting the first API call activity using decorated code associated with one or more APIs provided by the browser.

6. The method of claim 4, further comprising determining that the WebRTC API call activity is indicative of an attempt to collect internet protocol (IP) addresses related to the browser.

7. The method of claim 4, wherein determining that the first API call activity comprises WebRTC API call activity comprises determining that the first API call activity is indicative of an attempt to call an RTCPeerConnection API of a WebRTC protocol stack.

8. The method of claim 4, wherein determining that the first API call activity comprises WebRTC API call activity comprises determining that the first API call activity is indicative of an attempt to call a MediaDevices API of a WebRTC protocol stack.

9. The method of claim 8, wherein determining that the first API call activity is indicative of an attempt to call the MediaDevices API of the WebRTC protocol stack comprises determining that the first API call activity is indicative of an attempt to carry out an enumerateDevices method of the MediaDevices API.

10. The method of claim 4, further comprising determining that the WebRTC activity is indicative of an attempt to collect IP addresses related to the browser.

11. The method of claim 4, further comprising:
determining that the first network activity is indicative of network activity from the browser toward a known port address.

12. The method of claim 4, further comprising:
determining that content of the first network activity uses a STUN protocol or a TURN protocol.

13. The method of claim 4, further comprising generating a report indicating that the first digital content violates the policy.

14. The method of claim 4, further comprising:
receiving second digital content from the content server;
rendering the second digital content at the browser;
determining second API call activity on the browser, wherein the second API call activity is caused by the second digital content;
determining second network activity originating from the browser, wherein the second network activity is caused by the second digital content; and
determining, based at least in part on the second API call activity and the second network activity, that the second digital content complies with the policy.

15. A device comprising:
at least one memory that stores computer-executable instructions; and
at least one processor configured to access the at least one memory and execute the computer-executable instructions to:
receive first digital content from a content server;
render the first digital content at a browser, wherein the browser is a sandbox browser;
determine first network activity originating from the browser, wherein the first network activity is caused by the first digital content;
determine that the first network activity is indicative of an attempt to send a network packet from the browser to a session traversal utilities for network address translation (STUN) server or a traversal using relay network address translation (TURN) server;
determine first application programming interface (API) call activity on the browser, wherein the first API call activity is caused by the first digital content;
determine that the first API call activity comprises web real-time communication (WebRTC) API call activity; and
determine, based at least in part on the WebRTC API call activity and the WebRTC activity, that the first digital content violates a policy for serving digital content at user devices.

16. The device of claim 15, wherein the at least one processor is further configured to access the at least one memory and execute the computer-executable instructions to:
determine that the WebRTC API call activity is indicative of an attempt to collect internet protocol (IP) addresses related to the browser; and
generate a report indicating that the first digital content violates the policy.

17. The device of claim 15, wherein the at least one processor is further configured to access the at least one memory and execute the computer-executable instructions to:
determine first network activity originating from the browser, wherein the first network activity is caused by the first digital content;
determine that the first network activity comprises WebRTC activity; and
determine that the WebRTC activity is indicative of an attempt to collect IP addresses related to the browser.

* * * * *